Figure 1:
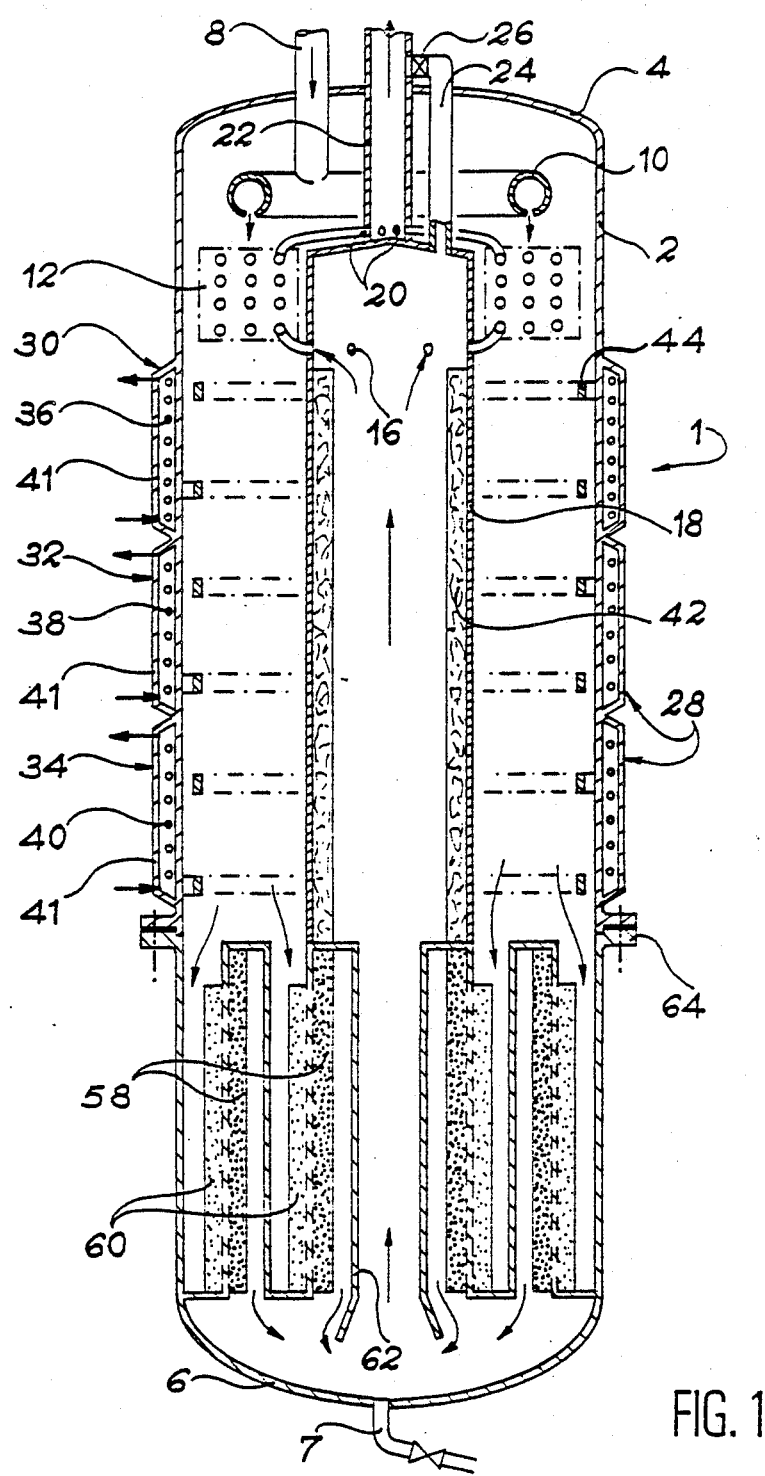

United States Patent [19]

Latge

[11] Patent Number: 4,928,497
[45] Date of Patent: May 29, 1990

[54] COLD TRAP FOR THE PURIFICATION OF A LIQUID METAL HAVING SEPARATE TRAPPING ZONES

[75] Inventor: Christian Latge, Aix en Provence, France

[73] Assignee: Commissariat a l'Energie Atomique, Paris, France

[21] Appl. No.: 278,032

[22] Filed: Nov. 30, 1988

[30] Foreign Application Priority Data

Dec. 3, 1987 [FR] France ............... 87 16786

[51] Int. Cl.$^5$ ............................................. G21C 19/30
[52] U.S. Cl. .................................. 62/55.5; 210/186; 376/312
[58] Field of Search ............... 376/312; 62/55.5, 123, 62/124; 210/186, 184, 187, 773, 774; 165/119; 266/227; 75/66; 55/269

[56] References Cited

U.S. PATENT DOCUMENTS

| | | | |
|---|---|---|---|
| 3,483,980 | 12/1969 | Cochran et al. | 210/186 |
| 3,552,485 | 1/1971 | Jannou et al. | 62/55.5 |
| 3,558,122 | 1/1971 | Jaross | 376/312 |
| 3,618,770 | 11/1971 | Pohl | 376/312 |
| 3,693,959 | 9/1972 | Swinhoe et al. | 376/312 |
| 4,278,499 | 7/1981 | Abramson et al. | 376/312 |
| 4,290,822 | 9/1981 | Maupre et al. | 376/312 |
| 4,389,310 | 6/1983 | Seki et al. | 376/312 |
| 4,432,208 | 2/1984 | Onuki et al. | 376/312 |
| 4,506,513 | 3/1985 | Max | 62/55.5 |
| 4,668,261 | 5/1987 | Chatzipetros et al. | 62/55.5 |
| 4,679,402 | 7/1987 | Andeen | 62/55.5 |
| 4,683,056 | 7/1987 | Humphries et al. | 210/186 |
| 4,693,088 | 9/1987 | Latge | 62/55.5 |

FOREIGN PATENT DOCUMENTS

| | | |
|---|---|---|
| 2062117 | 6/1971 | European Pat. Off. |
| 0012074 | 11/1980 | European Pat. Off. |
| 0136117 | 3/1985 | European Pat. Off. |
| 0167040 | 8/1986 | European Pat. Off. |

Primary Examiner—Daniel D. Wasil
Attorney, Agent, or Firm—Kerkam, Stowell, Kondracki & Clarke

[57] ABSTRACT

It comprises an enclosure (1), a supply pipe (8) for introducing the liquid metal to be purified into enclosure (1), a distributor (10) for distributing the liquid metal on the periphery of the enclosure, cooling means (30, 32, 34) positioned externally of the enclosure (1) and downstream of distributor (10) for producing a cooling zone (28) for the liquid metal to purified, at least one oxide retention element (58), a discharge pipe (22) for discharging the purified liquid metal, structures (44) for the attachment of the hydrides located within the enclosure (1) and level with the external cooling means (30, 32, 34).

9 Claims, 4 Drawing Sheets

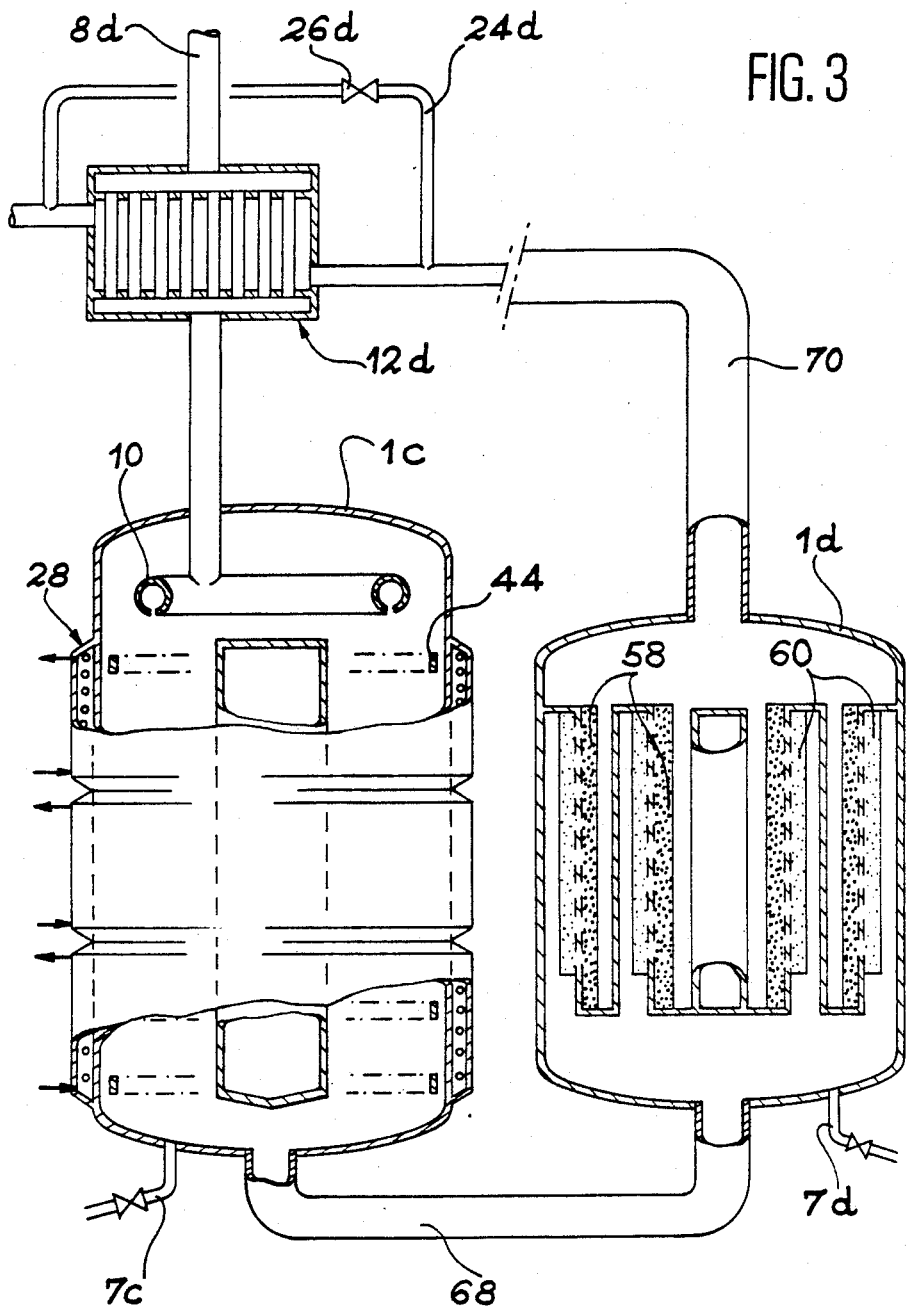

COLD TRAP FOR THE PURIFICATION OF A LIQUID METAL HAVING SEPARATE TRAPPING ZONES

DESCRIPTION

The invention relates to a cold trap for the purification of liquid metals having separate trapping zones.

More specifically, the invention relates to a cold trap for purifying a liquid metal containing oxygen and hydrogen in solution having an enclosure, a supply pipe for introducing said liquid metal to be purified into the enclosure, a distributor for distributing the liquid metal on the enclosure periphery, cooling means located externally of the enclosure and downstream of the distributor in order to create a cooling zone for the liquid metal to be purified, at least one retention element and a discharge pipe for discharging the purified liquid metal.

Fast neutron nuclear reactors use liquid sodium as the cooling fluid, both for the primary circuit and for the secondary circuits. During operation, the sodium is charged with impurities, mainly sodium hydride and oxide. It is necessary to eliminate these pollutions by means of traps, which hold back the impurities whilst reducing their solubility by cooling.

French patent application 125 315 of October 20 1967 already discloses a cold trap constituted by an enclosure containing an economizer exchanger, cooling means for bringing about the cooling of the liquid metal and a retention element for retaining the impurities. The cooling means are positioned outside the container and are constituted by an annular shell containing a stagnant medium and a pipe for circulating a cooling liquid surrounding the side wall of the container. The retention element comprises stainless steel wool cylinders.

Another cold trap of this type is also known (UKAEA, FR-A-2 070 919). It comprises a cylindrical pipe disposed in a container so as to define an annular space. Part of the pipe length is thermally insulated so as to limit the transmission of heat from the liquid metal flowing inside and outside said pipe. External cooling means extend at least in the region corresponding to the length of the pipe, which is of a thermally insulated nature. However, in these known liquid metal purification cold traps, the oxides and hydrides are simultaneously trapped, i.e. at the same location, in lining elements.

This leads to several disadvantages. Firstly, the cold trap capacity is limited because the retention elements also trap the oxides and hydrides. Thus, they rapidly become blocked or clogged. Another reason for the limitation of the trap capacity is the fact that the hydride, the main impurity in the secondary circuit, is trapped in the lining and therefore in the sodium passage cross-section. It is therefore necessary to change the lining several times during the life of the power station. Moreover, when it is wished to regenerate the lining elements, it is necessary to simultaneously treat the oxides and hydrides, because they have been trapped by the same lining element.

The present invention relates to a cold trap for the purification of a liquid metal, which obviates the aforementioned disadvantages. It has an increased trapping capacity and also makes it possible to separately treat the oxides and hydrides with a view to their regeneration.

According to the invention this object is achieved as a result of the fact that the cold trap has separate trapping zones for the oxides and the hydrides.

More specifically, the cold trap has hydride attachment structures, which are located within the enclosure, level with the external cooling means, which discharge a heat quantity at least equal to 10 kW/m$^2$, which leads to the crystallization of the hydrides in said zone.

These attachment structures also lead to turbulence in the flow of the liquid metal aiding the nucleation of the hydrides. In addition, these structures reinforce the mechanical strength of the deposits, particularly in the case of a thermal expansion of the outer sleeve.

As a result of these characteristics, the hydrides, whose nucleation kinetics are faster than those of the oxides, are deposited on the cold wall of the enclosure, in the area where the attachment structures are positioned and upstream of the lining elements. These elements, which are kept isothermal at the coldest temperature of the trap, are consequently not clogged by the hydrides and instead serve to trap the oxides. Their retention capacity with respect to the oxides is consequently increased. Therefore the life of the trap between two regenerations is greater.

Moreover, according to a preferred feature of the invention, the cold trap is constituted by two dismantlable parts, which can be separated from one another with a view to the treatment of the impurities contained therein. The first upstream part contains the attachment structures of the hydrides, whilst the downstream part contains the lining elements in which the oxides are trapped. It is therefore possible to separately treat each of these impurities, so that their treatment is facilitated. Other features and advantages of the present invention can be gathered from reading the following description of a non-limitative, illustrative embodiment with reference to the attached drawings, wherein show:

FIG. 1 A sectional view of a first embodiment of the invention.

Figure 2:
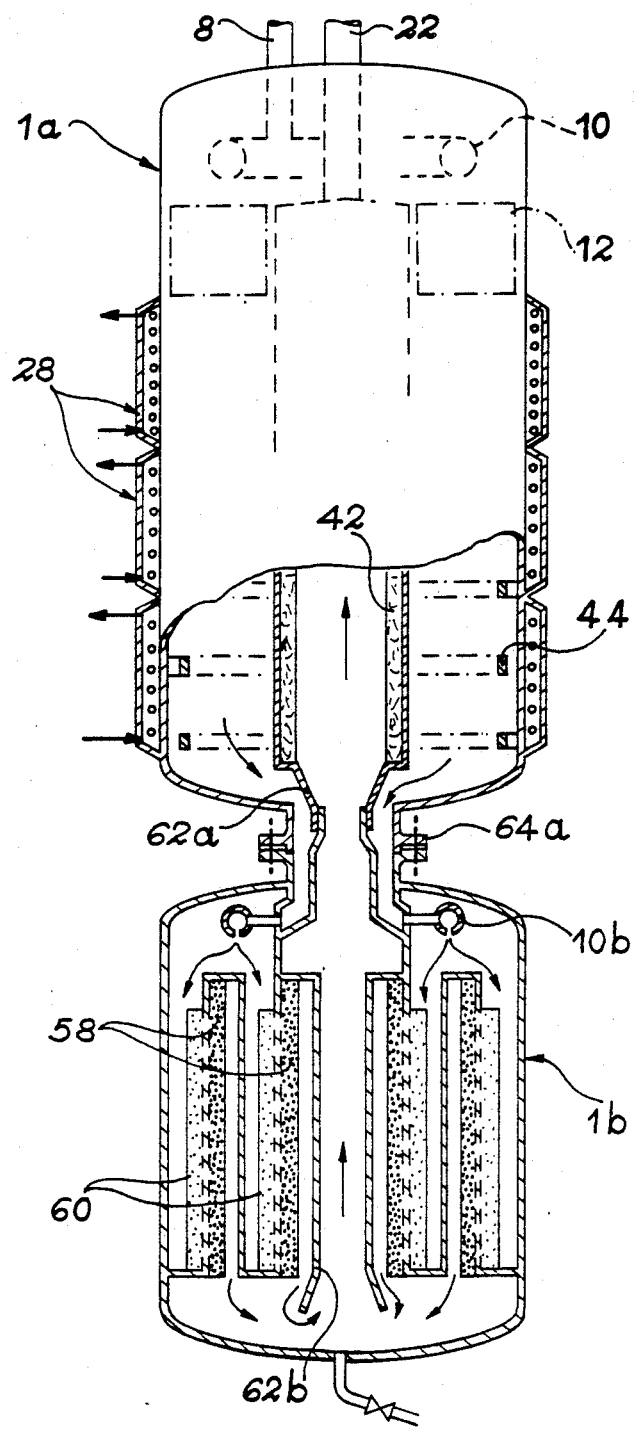

FIG. 2 A part sectional view of a second embodiment of the invention.

FIG. 3 A sectional view of a third embodiment of the invention.

FIGS, 4a, b, c, d Variants of an attachment structure for a cold trap according to the invention.

The cold trap shown in FIG. 1 comprises an enclosure 1 constituted by a sleeve 2 sealed by an upper base 4 and a lower base 6 provided with a discharge or emptying duct 7. The enclosure 1 serves to receive the liquid metal to be purified. For this purpose, a duct 8 supplies the sodium to be purified to a distributor 10, which is in the form of a torus having in its lower part orifices making it possible to distribute the sodium on the enclosure periphery. The liquid metal to be purified firstly passes through an economizer exchanger designated by the general reference 12. Exchanger 12 is constituted by a plurality of spirally wound tubes, each tube having an inlet 16 connected to a central passage or shaft 18 and an outlet 20 connected to a duct 22 for discharging the liquid metal from the cold trap. Prior to leaving the cold trap, the purified liquid metal passes through the spiral tubes 4. This purified metal is relatively more cold than the entering metal. There is consequently a heat exchange, which makes it possible on the one hand to lower the temperature of the entering metal and on the other to recover part of the heat of said metal in order to heat the exiting sodium.

A bypass 24 equipped with a valve 26 optionally makes it possible to directly discharge part of the purified sodium from the central passage to the discharge duct 22.

Downstream of the economizer exchanger 12, in the metal flow direction, is provided a cooling zone designated by the general reference 28. On the outer wall of the enclosure are arranged cooling modules 30, 32, 34, etc. They are constituted e.g. by coils such as 36, 38, 40 traversed by an organic fluid immersed in another stagnant or standing fluid, which serves as a thermal joint within an envelope 22 in which the fluid stagnates. It can also be an air cooling system.

The central passage 28 defines with the inner wall of sleeve 2 an annular space. A layer of an insulating material 42 is placed on one of the faces, e.g. the inner face of passage 18. The function of the insulating layer 42 is to prevent a heat exchange between the polluted sodium entering the cooling zone 28 and the relatively hotter sodium flowing whilst rising within the passage 18.

According to the invention, the temperature and flow rate of the cooling fluid of the cooling modules 30, 32, 34, etc. are chosen in such a way as to ensure a high thermal flux level with the sleeve 2 of at least 10 $kW/m^2$, which brings about the nucleation of hydride on the cold wall of the enclosure and therefore the formation of deposits. This objective is achieved all the more easily because the economizer exchanger effect is limited to the level of the passage 18 by lining it with an insulating material.

Figure 4A:
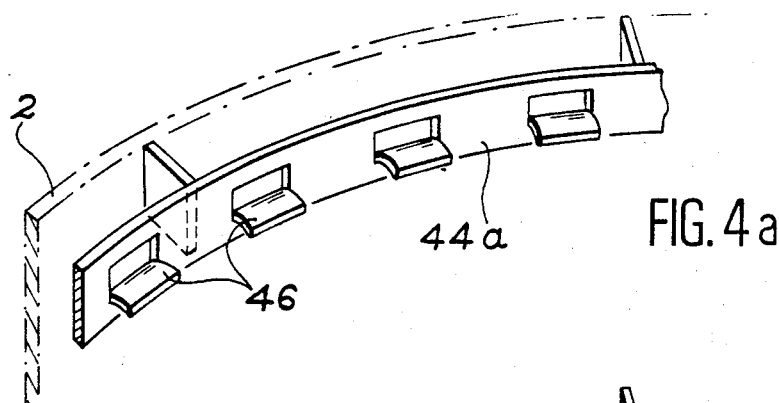
Figure 4B:
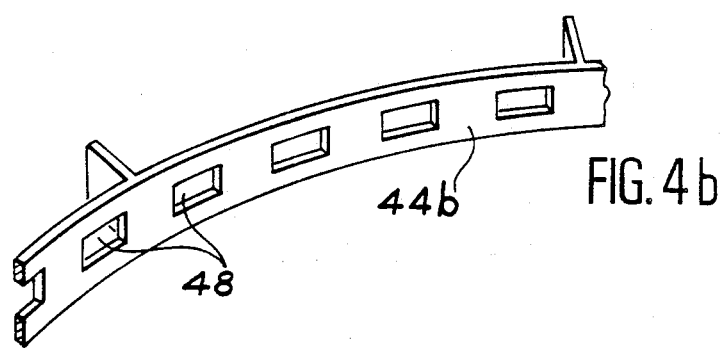
Figure 4C:
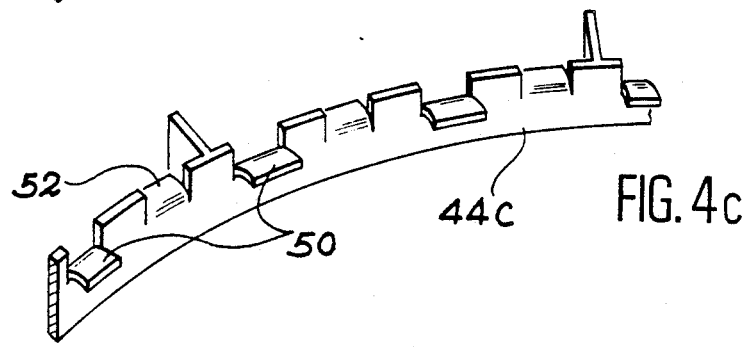
Figure 4D:
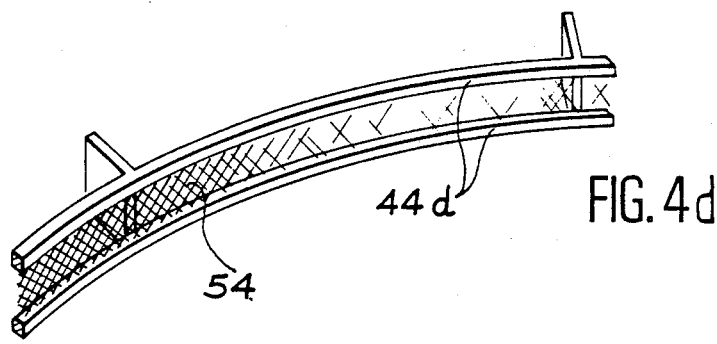

According to the invention, attachment structures 44 are preferably provided on the inner wall of enclosure 2. These attachment structures are in the form of rings fixed at a certain distance from the cylindrical wall of enclosure 2. These rings can be in different forms, as shown in FIGS. 4a to 4d. In FIG. 4a, ring 44a has tongues 46 folded towards the inside of the enclosure. In FIG. 4b, ring 44b has openings 48. In FIG. 4c, ring 44c has tongues 50 folded towards the inside of the enclosure and tongues 52 folded towards the outside of said enclosure. Finally, in FIG. 4d, the attachment structure is constituted by two rings 44d connected by a film 54 constituted e.g. by a metal gauze. In all these cases, the functions of the attachment structures are to produce turbulence, which assists the nucleation of the sodium hydride and ensures the mechanical strength or behaviour of the deposits formed, particularly in the case of a thermal expansion of sleeve 2.

Downstream of the cooling zone 28 is provided at least one annular retention element 58, e.g. constituted by a metal lining. The retention element 58 is located in the downstream zone of the trap, which is an isothermal zone, in view of the fact that there is no heat exchange with the outside. Each of the retention elements 58 preferably has several layers of density increasing in the flow direction and makes it possible to retain or hold back the sodium oxide ($Na_2O$), which does not crystallize on the cold walls of the sleeve 2 and instead crystallizes on the lining of filter 58 in an isothermal zone. Thus, although the nucleation mechanisms of the two impurities are identical (nucleation on the already existing crystalline or metal surfaces and not in the liquid sodium), the crystallization of the sodium oxide requires a longer residence time because the diffusion coefficient of hydrogen is higher than that of oxygen in the liquid sodium and the nucleation kinetics of the hydride are faster than those of oxides. The consequence of this difference is a difference in the purification mechanism in the cold trap, which only has a lining in a zone which is isothermal at the temperature of the cold point located downstream of the cooling zone.

In order to increase the trapping capacity of the retention element 58, the latter can be constituted by several concentric retention elements separated by sleeve 60.

An assembly flange 64 makes it possible to separate the upstream part of the cold trap from the downstream part, the upstream part containing the cooling zone 28 with the attachment structures 44 for the hydrides, whilst the downstream part contains the retention elements 58 having the metal lining on which the sodium oxide crystallizes. Therefore the upstream and downstream parts can be subjected to specific regeneration treatments.

FIG. 2 shows a constructional variant of the cold trap shown in fig. 1. The constructional variant of FIG. 2 differs by the fact that the cold trap is constituted by two enclosures, namely an upstream enclosure 1a and a downstream enclosure 1b. the upstream enclosure 1a contains the same elements as the upstream part of the cold trap described with reference to FIG. 1, namely a distributor 10, an economizer exchanger 12 downstream of distributor 10, a cooling zone 28, a central passage or shaft 18 having a layer of an insulant 44, cooling modules 30, 32, 34, etc. and attachment structures 44. Therefore these elements will not be described again.

The downstream part 1b essentially contains lining elements 58, whose constitution and operation are identical to those described relative to FIG. 1. Moreover, enclosure 1b has a distributor 10b constituted by a torus provided with orifices in its downwardly directed part in order to distribute the liquid metal to be purified in enclosure 1b. A central passage 62b permits the sodium to rise. This central passage 62b is connected to passage 62a of the upstream enclosure. Moreover, a connecting flange 64b makes it possible to connect the two enclosure 1a and 1b to one another. As for the preceding embodiment, the two enclosures can be exposed to specific treatments.

Finally, FIG. 3 shows a third embodiment of the cold trap according to the invention. As in the embodiment of FIG. 2, said cold trap is constituted by two separate enclosures, respectively an upstream enclosure 1c and a downstream enclosure 1d. However, these two enclosures are not directly connected to one another and are instead separated by a duct 68. The upstream enclosure 1c incorporates the same elements as enclosure 1a of FIG. 2, so that it will not be described in detail again. In the same way, enclosure 1d has the same elements as enclosure 1b of FIG. 2. However, there is no distributor for the distribution of liquid metal on the enclosure periphery. Furthermore, enclosure 1c has an emptying device 7c and enclosure 1d an emptying device 7d. The upper base of enclosure 1d is connected to the purified liquid metal discharge duct 70, which is connected to an economizer exchanger 12d. A bypass 24d makes it possible to discharge the purified metal without passing through the economizer exchanger. A valve 26d is fitted to said bypass.

The hot liquid metal to be purified 8d reaches the economizer exchanger through duct 8d prior to being introduced into enclosure 1c. Although the economizer exchanger is outside each of the enclosures 1c and 1d, its operation is the same as that of the economizer exchanger 12 described relative to FIG. 1.

As a result of the cold trap according to the invention, the sodium hydride (NaH), which results from the combination with the sodium of the hydrogen continuously produced in the steam generator, is trapped in isolated manner and firstly in a zone upstream of the retention elements 58. The entire capacity of these retention elements can therefore be reserved for the Na$_2$O and the soda (NaOH).

Moreover, as the hydrogen and tritium are trapped in the upstream part and the oxide in the downstream part of the trap, by separating the two parts, it is possible to apply a specific regeneration method to each impurity and therefore to separate the problems linked with the destruction of the hydride and the oxide.

I claim:

1. Cold trap for purifying a liquid metal containing oxygen and hydrogen in solution, said cold trap comprising a liquid metal circulation enclosure (1), a supply pipe (8) for introducing the liquid metal to be purified into enclosure (1), a distributor (10) for distributing the liquid metal on the enclosure periphery, a central passage (18) defining for the liquid metal a hairpin-like path between an annular zone of the dropping of said metal and a central raising zone with a view to the discharge thereof, cooling means (30, 32, 34) located outside enclosure (1) and downstream of distributor (10) in order to create a cooling zone (28) for the liquid metal to be purified, at least one oxide retention element (58) downstream of the cooling means and a discharge pipe (22) for discharging the purified liquid metal, characterized in that said cold trap further comprises structures (44) for the attachment of hydrides, said attachment structures being located within the enclosure (1) and level with external cooling means (30, 32, 34) as well as a thermal insulating layer (42) placed on the wall of said passage (18), said insulating layer (42) having the function of limiting the heat exchange on the wall of said passage (18).

2. Cold trap according to claim 1, characterized in that the cooling means (30, 32, 34) are constituted by several cooling modules, which can be put into operation independently of one another.

3. Cold trap according to claim 2, characterized in that said enclosure (1) is constituted by first and second tanks (1a, 1b, 1c, 1d) interconnected by a connecting pipe permitting the passage of the liquid metal to be purified, said first tank (1a, 1c) containing the liquid metal distributor (10) and cooling means (30, 32, 34), said second tank (1b, 1d) containing the retention element (58).

4. Cold trap according to claim 3, characterized in that the second tank (1b, 1d) has a central passage (62b) by which the liquid metal to be purified returns to the connecting pipe.

5. Cold trap according to claim 3, characterized in that the second tank (1d) has a return pipe (70) by which the metal passes out of the second tank and returns to an economizer exchanger (12d).

6. Cold trap according to claim 1, characterized in that the attachment structures (44) are constituted by rings fixed to the interior of the enclosure and spaced from said enclosure wall.

7. Cold trap according to claim 6, characterized in that the rings have tongues (46, 50, 52) projecting at least from one side of the ring.

8. Cold trap according to claim 6, characterized in that the rings have orifices (48) for causing turbulence.

9. Cold trap according to claim 6, characterized in that the rings are at least partly constituted by a metal gauze (54).

* * * * *